(12) United States Patent
Sayana et al.

(10) Patent No.: US 11,546,787 B2
(45) Date of Patent: Jan. 3, 2023

(54) CSI DEFINITIONS AND FEEDBACK MODES FOR COORDINATED MULTI-POINT TRANSMISSION

(71) Applicant: Samsung Electronics Co., LTD, Suwon-si (KR)

(72) Inventors: Krishna Sayana, San Jose, CA (US); Young-Han Nam, Richardson, TX (US); Jin-Kyu Han, Allen, TX (US); Boon Loong Ng, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 13/888,659

(22) Filed: May 7, 2013

(65) Prior Publication Data

US 2013/0301448 A1 Nov. 14, 2013

Related U.S. Application Data

(60) Provisional application No. 61/644,957, filed on May 9, 2012.

(51) Int. Cl.
*H04W 24/10* (2009.01)
*H04B 7/024* (2017.01)
*H04B 7/06* (2006.01)

(52) U.S. Cl.
CPC ............ *H04W 24/10* (2013.01); *H04B 7/024* (2013.01); *H04B 7/0626* (2013.01)

(58) Field of Classification Search
None
See application file for complete search history.

(56) References Cited

U.S. PATENT DOCUMENTS 9,008,585 B2 * 4/2015 Xiao .................. H04W 72/082
455/63.1
9,136,997 B2 * 9/2015 Gaal .................... H04L 5/0048
(Continued)

FOREIGN PATENT DOCUMENTS

CN 102045140 A 5/2011
CN 102111246 A 6/2011
(Continued)

OTHER PUBLICATIONS

ZTE, Discussion on Interference Measurement for CSI Feedback, Oct. 2011, 3GPP TSG-RAN WG1 Meeting #66bis (R1-113011), pp. 1-4. (Year: 2011).*
(Continued)

*Primary Examiner* — Nicholas Sloms

(57) ABSTRACT

A method and apparatus report channel state information (CSI) feedback of a user equipment (UE) in a coordinated multipoint communication system. The method includes identifying, when downlink transmissions to the UE are configured with at least two CSI subframe subsets, an interference measurement resource within one of the CSI subframe subsets belonging to a CSI reference resource. The method also includes using the identified interference measurement resource to derive an interference measurement. The apparatus includes a controller configured to, when downlink transmissions to the UE are configured with at least two CSI subframe subsets, identify an interference measurement resource within one of the CSI subframe subsets belonging to a CSI reference resource. The controller is configured to use the identified interference measurement resource to derive an interference measurement.

19 Claims, 7 Drawing Sheets

(56) References Cited

U.S. PATENT DOCUMENTS

| | | | |
|---|---|---|---|
| 9,198,047 B2 | 11/2015 | Kang et al. | |
| 2010/0246376 A1* | 9/2010 | Nam | H04L 5/0051 370/208 |
| 2011/0275394 A1 | 11/2011 | Song et al. | |
| 2011/0319109 A1 | 12/2011 | Kang et al. | |
| 2012/0099527 A1 | 4/2012 | Ishii | |
| 2012/0207105 A1 | 8/2012 | Geirhofer et al. | |
| 2012/0287875 A1 | 11/2012 | Kim et al. | |
| 2013/0208678 A1* | 8/2013 | Zhang | H04L 5/0053 370/329 |
| 2013/0242902 A1* | 9/2013 | Liu | H04W 24/10 370/329 |
| 2013/0258874 A1* | 10/2013 | Khoshnevis | H04L 5/0057 370/252 |
| 2013/0258965 A1* | 10/2013 | Geirhofer | H04W 72/048 370/329 |
| 2013/0301548 A1* | 11/2013 | Etemad | H04B 7/065 370/329 |
| 2013/0315337 A1 | 11/2013 | Dai et al. | |
| 2014/0086166 A1* | 3/2014 | Lindbom | H04W 52/16 370/329 |
| 2014/0219115 A1* | 8/2014 | Etemad | H04W 28/12 370/252 |
| 2014/0355468 A1 | 12/2014 | Li et al. | |

FOREIGN PATENT DOCUMENTS

| | | |
|---|---|---|
| CN | 102118868 A | 7/2011 |
| CN | 102131225 A | 7/2011 |
| CN | 102368697 A | 3/2012 |
| WO | 2011115421 A2 | 9/2011 |
| WO | 2012055284 A1 | 5/2012 |

OTHER PUBLICATIONS

European Search Report dated May 27, 2014 in connection with European Patent Application No. 13167033.3, 7 pages.
3GPP TSG RAN WG1 Meeting #68; "Utilization of resource-restricted measurements for CoMP feedback"; R1-120030; Feb. 6-10, 2012; Dresden, Germany; 3 pages.
3GPP TSG RAN WG1 Meeting #68; "Resources for Interference Measurements"; R1-120032; Feb. 6-10, 2012; Dresden, Germany; 10 pages.
3GPP TSG RAN WG1 Meeting #68bis; "Resource-restricted measurements for CoMP feedback"; R1-120981; Mar. 26-30, 2012; Jeju, Korea; 3 pages.
International Search Report dated Aug. 22, 2013 in connection with International Patent Application No. PCT/KR2013/004071, 3 pages.
3GPP TSG RAN WG1 Meeting #68bis; "Consideration on Interference Measurement"; R1-121092; Mar. 26-30, 2012; Jeju, Korea; 4 pages.
3GPP TSG RAN WG1 Meeting #68bis; "Interference Measurement support for REel-11"; R1-121278; Mar. 26-30, 2012; Jeju, Korea; 4 pages.
3GPP TSG RAN WG1 Meeting #68bis; "Interference Measurement Resource for Downlink CoMP"; R1-121627; Mar. 26-30, 2012; Jeju, Korea; 5 pages.
3GPP TSG RAN WG1 Meeting #68bis; "Resources for Interference Measurements"; R1-120983; Mar. 26-30, 2012; Jeju, Korea; 9 pages.
3GPP TSG RAN WG1 Meeting #68bis; "Consideration on Interference Measurement RE configuration"; R1-121810; Mar. 26-30, 2012; Jeju, Korea; 3 pages.
3GPP TS 36.211 V10.1.0, "3rd Generation Partnership Project; Technical Specification Group Radio Access Network; Evolved Universal Terrestrial Radio Access (E-UTRA); Physical Channels and Modulation (Release 10)", Mar. 2011, 103 pages.
3GPP TS 36.212 V10.1.0, "3rd Generation Partnership Project; Technical Specification Group Radio Access Network; Evolved Universal Terrestrial Radio Access (E-UTRA); Multiplexing and Channel Coding (Release 10)", Mar. 2011, 76 pages.
3GPP TS 36.213 V10.1.0, "3rd Generation Partnership Project; Technical Specification Group Radio Access Network; Evolved Universal Terrestrial Radio Access (E-UTRA); Physical Layer Procedures (Release 10)", Mar. 2011, 115 pages.
3GPP TR 36.819 V11.0.0, "3rd Generation Partnership Project; Technical Specification Group Radio Access Network; Coordinated Multi-Point Operation for LTE Physical Layer Aspects (Release 11)", Sep. 2011, 68 pages.
RP-111365, "Coordinated Multi-Point Operation for LTE—Downlink Core Part", Sep. 15, 2011, 6 pages.
RP-111365, "Coordinated Multi-Point Operation for LTE—Downlink Performance Part", Sep. 15, 2011, 5 pages.
RP-111365, "Coordinated Multi-Point Operation for LTE", Sep. 15, 2011, 5 pages.
RP-111365, "Coordinated Multi-Point Operation for LTE—Uplink Core Part", Sep. 15, 2011, 6 pages.
RP-111365—Coordinated Multi-Point Operation for LTE—Uplink Performance Part, Sep. 15, 2011, 5 pages.
"Measurement Definitions for Resource-Restricted Measurements," 3GPP TSG RAN WG1 Meeting #63bis, R1-110020, Huawei and HiSilicon, Dublin, Ireland, Jan. 17-21, 2011, 6 pages.
Foreign Communication From a Related Counterpart Application, European Application No. 13167033.3, Communication Pursuant to Article 94(3) EPC dated Jan. 3, 2017, 11 pages.
Foreign Communication From a Related Counterpart Application, Chinese Application No. 201380024590.5, Text of the First Office Action dated Jan. 26, 2017, 17 pages.
European Office Action for European Application No. 13167033.3, dated Sep. 6, 2017. (7 pages).
Chinese Office Action for Chinese Application No. 201380024590. 5, dated Sep. 30, 2017. (25 pages).
3GPP TS 36.211 V10.4.0; 3rd Generation Partnership Project; Technical Specification Group Radio Access Network; Evolved Universal Terrestrial Radio Access (E-UTRA); Physical Channels and Modulation (Release 10) Dec. 12, 2011. (101 pages).
LG Electronics, "Consideration on Interference measurement RE configuration", 3GPP TSG RAN WG1 Meeting #68b, Mar. 26-30, 2012, 3 pages, R1-121810.
Communication pursuant to Article 94(3) EPC dated Feb. 8, 2019 in connection with European Patent Application No. 13 167 033.3, 6 pages.
Office Action in connection with Indian Application No. 2358/KOLNP/2014 dated Dec. 11, 2019, 7 pages.
China National Intellectual Property Administration, "Notification of the Decision to Grant" dated Nov. 16, 2021, in connection with Chinese Patent Application No. 201910409086.6, 8 pages.
Samsung, "Discussion on the Definition of CQI in CoMP", R1-114225, 3GPP TSG RAN WG1 #67, San Francisco, USA, Nov. 14-18, 2011, 2 pages.
"3rd Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.1.0, Mar. 2011, 290 pages.
Non-Final Office Action dated May 27, 2021 in connection with U.S. Appl. No. 16/947,248, 14 pages.
Office Action dated May 3, 2021 in connection with Korean Application No. 10-2021-7010328, 13 pages.
USPTO Final Office Action issued May 24, 2022 regarding co-pending U.S. Appl. No. 16/947,248, 20 pages.

* cited by examiner

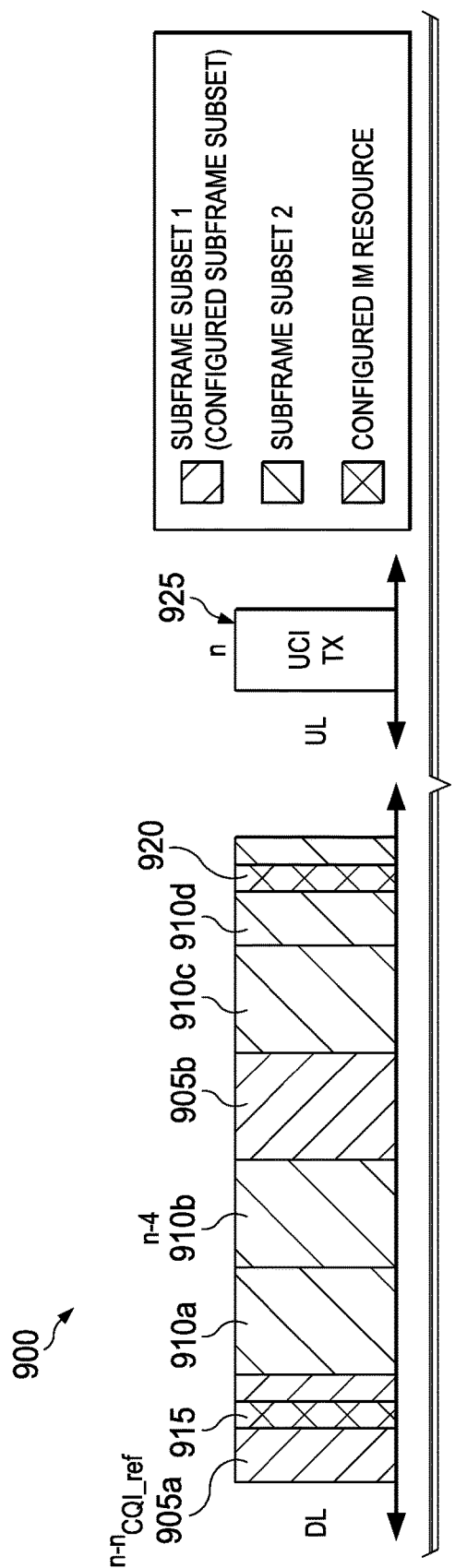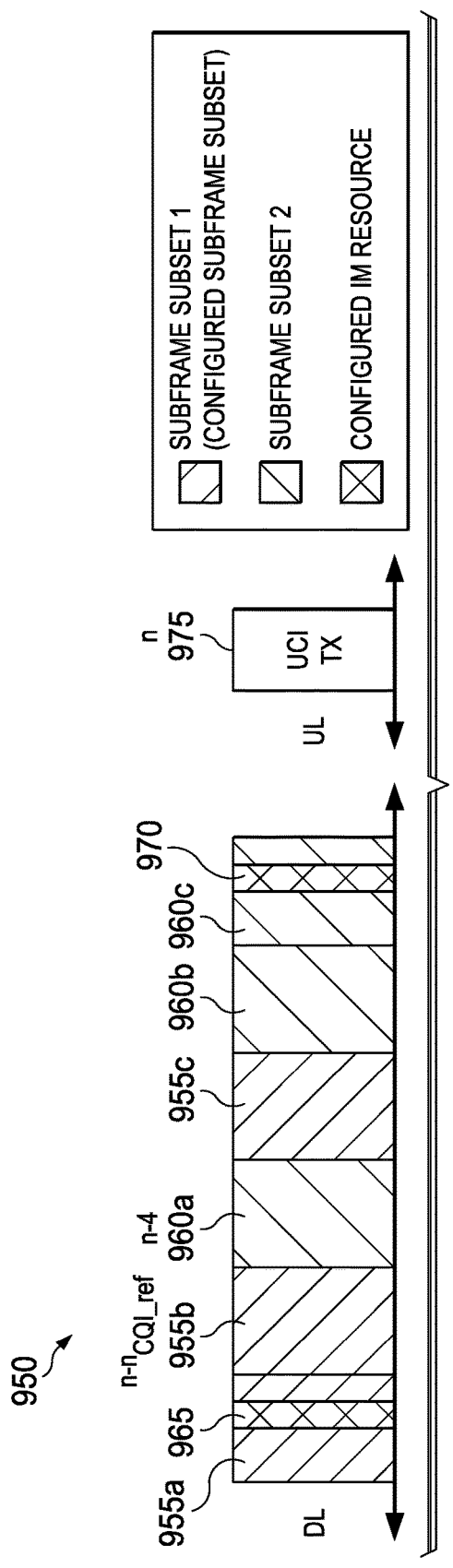
FIG. 9A
FIG. 9B

CSI DEFINITIONS AND FEEDBACK MODES FOR COORDINATED MULTI-POINT TRANSMISSION

CROSS-REFERENCE TO RELATED APPLICATION(S) AND CLAIM OF PRIORITY

The present application claims priority to U.S. Provisional Patent Application Ser. No. 61/644,957 filed May 9, 2012, entitled "CSI DEFINITIONS AND FEEDBACK MODES FOR COORDINATED MULTI-POINT TRANSMISSION". The content of the above-identified patent document is incorporated herein by reference.

TECHNICAL FIELD

The present application relates generally to Coordinated Multi-Point (CoMP) communication and, more specifically, to channel state information (CSI) feedback for CoMP communication.

BACKGROUND

CoMP technology has been standardized to allow the user equipment (UE) to receive signals from multiple transmission points (TPs) in different usage scenarios. The different scenarios include: 1) a homogeneous network with intra-site CoMP, 2) a homogeneous network with high transmit (Tx) power remote radio heads (RRHs), 3) a heterogeneous network with low-power RRHs within the macro cell coverage where the transmission/reception points created by the RRHs have different cell identifiers (IDs) from the macro cell, and 4) a heterogeneous network with low power RRHs within the macro cell coverage where the transmission/reception points created by the RRHs have the same cell IDs as the macro cell. The CoMP communication schemes that have been identified as the focus for standardization are joint transmission (JT); dynamic point selection (DPS), including dynamic point blanking; and coordinated scheduling/beamforming, including dynamic point blanking. Further description of the CoMP usage scenarios is included in 3GPP TS 36.819, which is expressly incorporated by reference herein.

Accordingly, there is a need for improved techniques in the CoMP communication schemes.

SUMMARY

Embodiments of the present disclosure provide CSI definitions and feedback modes for CoMP.

In one embodiment, a method for CSI feedback reporting by a UE in a CoMP communication system is provided. The method includes identifying, when downlink transmissions to the UE are configured with at least two CSI subframe subsets, an interference measurement resource within one of the CSI subframe subsets belonging to a CSI reference resource. The method also includes using the identified interference measurement resource to derive an interference measurement.

In another embodiment, a method for receiving CSI feedback reporting by base station in a CoMP communication system is provided. The method includes receiving, in an uplink control information transmissions from a UE, CSI feedback based on an interference measurement. Downlink transmissions to the UE are configured with at least two CSI subframe subsets. The interference measurement is derived using an interference measurement resource identified within one of the CSI subframe subsets belonging to a CSI reference resource.

In yet another embodiment, an apparatus in a UE capable of CSI feedback reporting in a CoMP communication system is provided. The apparatus includes a controller configured to, when downlink transmissions to the UE are configured with at least two CSI subframe subsets, identify an interference measurement resource within one of the CSI subframe subsets belonging to a CSI reference resource; and to use the identified interference measurement resource to derive an interference measurement.

In another embodiment, an apparatus for receiving channel state information (CSI) feedback reporting by base station in a CoMP communication system is provided. The apparatus includes a receiver configured to receive, in an uplink control information transmission from a UE, CSI feedback information based on an interference measurement. Downlink transmissions to the UE are configured with at least two CSI subframe subsets. The interference measurement is derived using an interference measurement resource identified within one of the CSI subframe subsets belonging to a CSI reference resource.

In one or more of the embodiment, if the UE is configured with multiple interference measurement resources, the CSI configurations may each include an associated CSI reference signal resource index and interference measurement resource index pair. Each CSI configuration may be for a particular TP or CSI process.

In one or more of the embodiment, independent periodic physical unlink control channel (PUCCH) for multiple CSI configurations is provided. In this embodiment, the periodic feedback mode parameters are set up independently for two or more CSI configurations Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 9A and 9B illustrate examples of a reference subframe with a configuration of IM resource and CSI subframe subsets in accordance with various embodiments of the present disclosure.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following standards documents are incorporated by reference herein: 1) 3GPP TS 36.211 v10.1.0, "E-UTRA, Physical channels and modulation;" 2) 3GPP TS 36.212 v10.1.0, "E-UTRA, Multiplexing and Channel coding;" 3) 3GPP TS 36.213 v10.1.0, "E-UTRA, Physical Layer Procedures;" 4) RP-111365 Coordinated Multi-Point Operation for LTE WID; and 5) 3GPP TR 36.819 V11.0.0 (2011-09).

Figure 1:
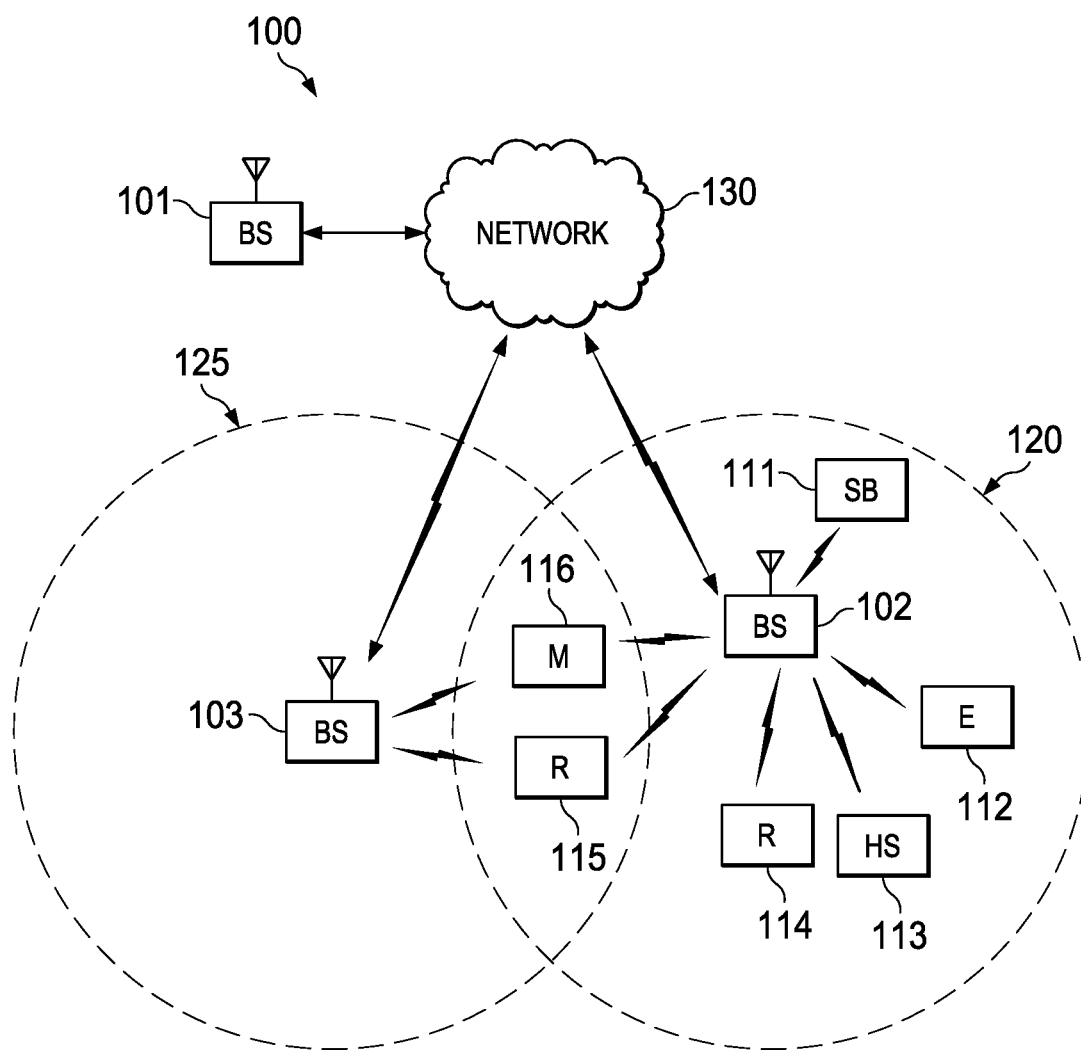
FIG. 1 illustrates an exemplary wireless system which transmits messages in accordance with an illustrative embodiment of the present disclosure.
Figure 2:
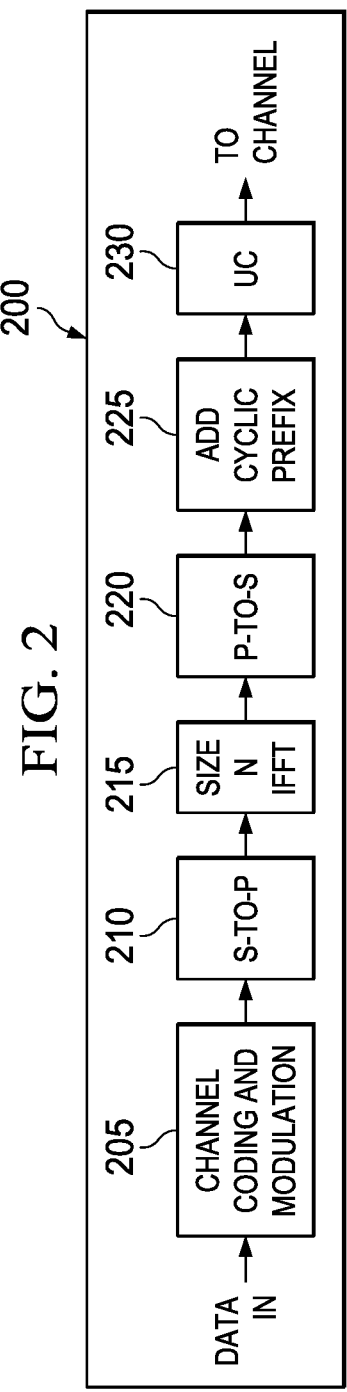
FIG. 2 illustrates a high-level diagram of an orthogonal frequency division multiple access transmit path in accordance with an illustrative embodiment of the present disclosure.
Figure 3:
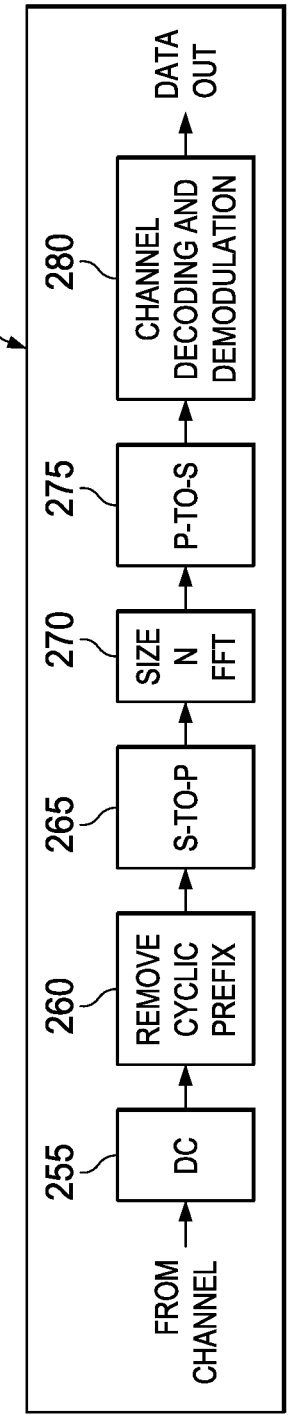
FIG. 3 illustrates a high-level diagram of an orthogonal frequency division multiple access receive path in accordance with an illustrative embodiment of the present disclosure.

FIGS. 1-3 below describe various embodiments implemented in wireless communication systems and with the use of OFDM or OFDMA communication techniques. The description of FIGS. 1-3 is not meant to imply physical or architectural limitations to the manner in which different embodiments may be implemented. Different embodiments of the present disclosure may be implemented in any suitably arranged communications system.

FIG. 1 illustrates exemplary wireless system 100, which transmits messages according to the principles of the present disclosure. In the illustrated embodiment, wireless system 100 includes transmission points (e.g., an Evolved Node B (eNB), Node B), such as base station (BS) 101, base station (BS) 102, base station (BS) 103, and other similar base stations or relay stations (not shown). Base station 101 is in communication with base station 102 and base station 103. Base station 101 is also in communication with network 130 or a similar IP-based system (not shown).

Base station 102 provides wireless broadband access (via base station 101) to network 130 to a first plurality of UEs (e.g., mobile phone, mobile station, subscriber station) within coverage area 120 of base station 102. The first plurality of UEs includes UE 111, which may be located in a small business (SB); UE 112, which may be located in an enterprise (E); UE 113, which may be located in a WiFi hotspot (HS); UE 114, which may be located in a first residence (R); UE 115, which may be located in a second residence (R); and UE 116, which may be a mobile device (M), such as a cell phone, a wireless laptop, a wireless PDA, or the like.

Base station 103 provides wireless broadband access (via base station 101) to network 130 to a second plurality of UEs within coverage area 125 of base station 103. The second plurality of UEs includes UE 115 and UE 116. In an exemplary embodiment, base stations 101-103 may communicate with each other and with UEs 111-116 using OFDM or OFDMA techniques.

While only six UEs are depicted in FIG. 1, it is understood that wireless system 100 may provide wireless broadband access to additional UEs. It is noted that UE 115 and UE 116 are located on the edges of both coverage area 120 and coverage area 125. UE 115 and UE 116 each communicate with both base station 102 and base station 103 and may be said to be operating in handoff mode, as known to those of skill in the art.

UEs 111-116 may access voice, data, video, video conferencing, and/or other broadband services via network 130. In an exemplary embodiment, one or more of UEs 111-116 may be associated with an access point (AP) of a WiFi WLAN. UE 116 may be any of a number of mobile devices, including a wireless-enabled laptop computer, personal data assistant, notebook, handheld device, or other wireless-enabled device. UEs 114 and 115 may be, for example, a wireless-enabled personal computer (PC), a laptop computer, a gateway, or another device.

FIG. 2 is a high-level diagram of transmit path circuitry 200. For example, the transmit path circuitry 200 may be used for an orthogonal frequency division multiple access (OFDMA) communication. FIG. 3 is a high-level diagram of receive path circuitry 300. For example, the receive path circuitry 300 may be used for an orthogonal frequency division multiple access (OFDMA) communication. In FIGS. 2 and 3, for downlink communication, the transmit path circuitry 200 may be implemented in base station (BS) 102 or a relay station, and the receive path circuitry 300 may be implemented in a UE (e.g., UE 116 of FIG. 1). In other examples, for uplink communication, the receive path circuitry 300 may be implemented in a base station (e.g., base station 102 of FIG. 1) or a relay station, and the transmit path circuitry 200 may be implemented in a UE (e.g., UE 116 of FIG. 1).

Transmit path circuitry 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, and up-converter (UC) 230. Receive path circuitry 300 comprises down-converter (DC) 255, remove cyclic prefix block 260, serial-to-parallel (S-to-P) block 265, Size N Fast Fourier Transform (FFT) block 270, parallel-to-serial (P-to-S) block 275, and channel decoding and demodulation block 280.

At least some of the components in FIGS. 2 and 3 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path circuitry 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and UE 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at UE 116 after passing through the wireless channel, and reverse operations to those at BS 102 are performed. Down-converter 255 down-converts the received signal to baseband frequency, and remove cyclic prefix block 260 removes the cyclic prefix to produce the serial time-domain baseband signal. Serial-to-parallel block 265 converts the time-domain baseband signal to parallel time-domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to UEs 111-116 and may implement a receive path that is analogous to receiving in the uplink from UEs 111-116. Similarly, each one of UEs 111-116 may implement a transmit path corresponding to the architecture for transmitting in the uplink to base stations 101-103 and may implement a receive path corresponding to the architecture for receiving in the downlink from base stations 101-103.

Figure 4:
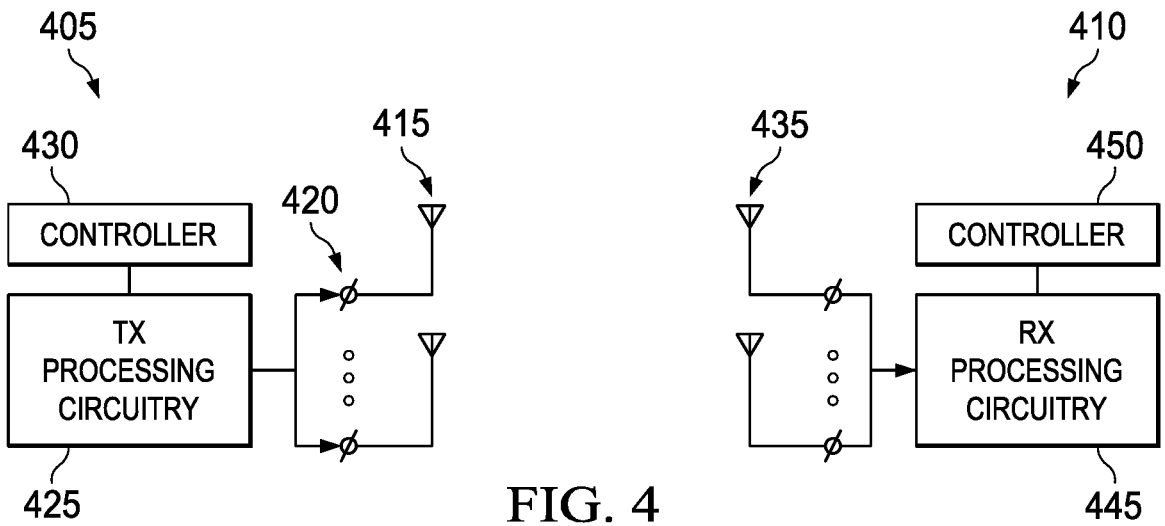
FIG. 4 illustrates a block diagram of a transmitter and a receiver in a wireless communication system that may be used to implement various embodiments of the present disclosure.

FIG. 4 illustrates a block diagram of a transmitter 405 and a receiver 410 in a wireless communication system that may be used to implement various embodiments of the present disclosure. In this illustrative example, the transmitter 405 and the receiver 410 are devices at a communication point in a wireless communication system, such as, for example, wireless system 100 in FIG. 1. In some embodiments, the transmitter 405 or the receiver 410 may be a network entity, such as a base station, e.g., an evolved node B (eNB), a remote-radio head, a relay station, an underlay base station; a gateway (GW); or a base station controller (BSC). In other embodiments, the transmitter 405 or the receiver 410 may be a UE (e.g., mobile station, subscriber station, etc.). In one example, the transmitter 405 or the receiver 410 is an example of one embodiment of the UE 116 in FIG. 1. In another example, the transmitter 405 or the receiver 410 is an example of one embodiment of the base station 102 in FIG. 1.

The transmitter 405 comprises antenna(s) 415, phase shifters 420, Tx processing circuitry 425, and controller 430. The transmitter 405 receives analog or digital signals from outgoing baseband data. Transmitter 405 encodes, multiplexes, and/or digitizes the outgoing baseband data to produce a processed RF signal that is sent and/or transmitted via transmitter 405. For example, the Tx processing circuitry 425 may implement a transmit path that is analogous to the transmit processing circuitry 200 in FIG. 2. Transmitter 405 may also perform spatial multiplexing via layer mapping to different antennas in antenna(s) 415 to transmit signals in multiple different beams. The controller 430 controls the overall operation of transmitter 405. In one such operation, controller 430 controls the transmission of signals by the transmitter 405 in accordance with well-known principles.

Receiver 410 receives from antenna(s) 435 an incoming RF signal or signals transmitted by one or more transmission points, such as base stations, relay stations, remote radio heads, UEs, etc. Receiver 410 includes Rx processing circuitry 445 that processes the received signal(s) to identify the information transmitted by the transmission point(s). For example, the Rx processing circuitry 445 may down-convert the incoming RF signal(s) to produce an intermediate frequency (IF) or a baseband signal by channel estimating, demodulating, stream separating, filtering, decoding, and/or digitizing the received signal(s). For example, the Rx processing circuitry 445 may implement a receive path that is analogous to the receive processing circuitry 300 in FIG. 3. The controller 450 controls the overall operation of the receiver 410. In one such operation, the controller 450 controls the reception of signals by the receiver 410 in accordance with well-known principles.

In various embodiments, the transmitter 405 is located within a TP, and the receiver is located within a UE in a CoMP communication system. For example, in the CoMP communication, multiple TPs may include transmitters similar to the transmitter 405 that transmits to the UE. The multiple TPs may be any combination of base stations (e.g., eNB, macro base stations, etc.), RRHs, and/or underlay base stations (e.g., micro base stations, relay stations, etc.).

The illustration of transmitter 405 and receiver 410 illustrated in FIG. 4 is for the purposes of illustrating one embodiment in which embodiments of the present disclosure may be implemented. Other embodiments of the transmitter 405 and the receiver 410 may be used without departing from the scope of this disclosure. For example, the transmitter 405 may be located in a communication node (e.g., BS, UE, RS, and RRH) that also includes a receiver, such as receiver 410. Similarly, the receiver 410 may be located in a communication node (e.g., BS, UE, RS, and RRH) that also includes a transmitter, such as transmitter 405. Antennas in the Tx and Rx antenna arrays in this communication node may overlap or be the same antenna arrays used for transmission and reception via one or more antenna switching mechanisms.

Figure 5:
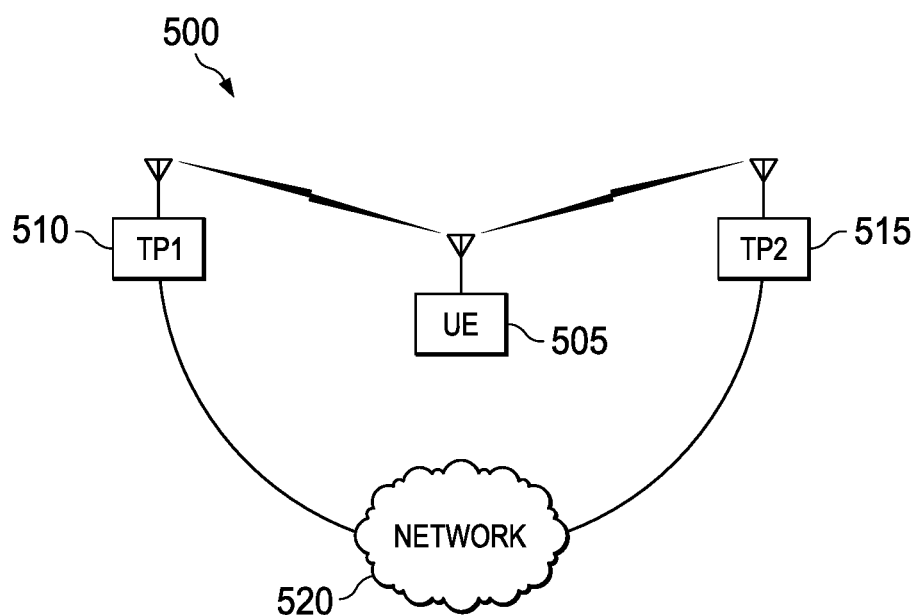
FIG. 5 illustrates a block diagram of a CoMP communication system in accordance with various embodiments of the present disclosure.

FIG. 5 illustrates a block diagram of a CoMP communication system 500 in accordance with various embodiments of the present disclosure. In this illustrative example, the CoMP communication system 500 includes a UE 505 and two TPs 510 and 515. For example, the UE 505 may include a receiver and transmitter as illustrated in FIG. 4. The TPs 510 and 515 may also include a receiver and transmitter as illustrated in FIG. 4. The TPs 510 and 515 may be any combination of base stations (e.g., eNB, macro base stations, etc.), RRHs, and/or underlay base stations (e.g., micro base stations, relay stations, etc.). Additionally, other TPs and UEs may be present in the CoMP communication system 500. For example, more than two TPs may communicate with the same UE 505.

The TPs 510 and 515 are connected to a network 520. For example, the TPs 510 and 515 may be connected by a wire line and/or fiber optical network. The network 520 provides connections between the TPs 510 and 515 to provide data and control information for wireless communication between the TPs 510 and 515 and the UE 505. The network 520 performs scheduling for wireless communications in the CoMP communication system 500. For example, the network 520 may include one or more gateways; or base station controllers. In one example, the network 520 may be one embodiment of the network 130 in FIG. 1.

With the different CoMP transmission schemes described in the background above, the network 520 needs to know the channel quality indicator (CQI), precoding matrix indicator (PMI), and rank indicator (RI) supported by the UE to optimize scheduling. The feedback definitions and measurements are defined for a single-cell transmission for LIE Release 8 to Release 10. The individual CoMP scheme performance may also be characterized by other parameters, such as the TPs used in the CoMP scheme; precoding applied at each of the one or more transmitting TPs; the TPs that are blanked or not transmitting; and the interference measurement resource that may be configured for measurement of individual CQIs.

A CSI reference signal (RS) enables channel measurements by a UE. A UE specific CSI-RS configuration includes: 1) a non-zero power CSI-RS resource; and 2) one or more zero-power CSI-RS resources. Typically, the non-zero power CSI-RS resource corresponds to the antenna elements/ports of the serving cell. Zero-power CSI-RS, also commonly referred to as muted CSI-RS, are used to protect the CSI-RS resources of another cell, and a UE is expected to rate match (skip for decoding/demodulation) around these resources. Additional configuration details of the CSI-RS are specified in 3GPP TS 36.211, particularly in sections 6.10.5 and 7.2.5.

To support CoMP transmission, a network needs feedback corresponding to multiple transmission points or cells. As a result, a network can set up multiple CSI-RS resources, each typically corresponding to a TP or CSI process. Unless otherwise stated, the terms "CSI-RS resource," "TP," and "CSI process" may be used interchangeably. Further details of CSI-RS resource configurations and the configurable parameters for each CSI-RS resource may include that configuration of multiple non-zero-power CSI-RS resources include at least: AntennaPortsCount, ResourceConfig, SubframeConfig, $P_c$, and a Parameter X to derive scrambling initialization $c_{init}=2^{10}\cdot(7\cdot(n_s+1)+l+1)\cdot(2\cdot X+1)+2\cdot X+N_{CP}$. X ranges from 0 to 503 and can be interpreted as virtual cell id. In Release 10, X is the PCI of the serving cell. These parameters are configured per CSI-RS resource. $P_c$ is the UE assumption on reference PDSCH transmitted power for CSI feedback. Some parameters may be configured per CSI-RS port considering the decision of supporting coherent joint transmission by the aggregate CSI feedback corresponding to multiple TPs in one CSI-RS resource. While the CSI-RS resources capture channels of individual TPs, the interference measurement also depends on the CoMP scheme. In Releases 8-10, a single interference measurement resource is used, which is the cell-specific reference signal (CRS) itself. Interference measurement on CRS captures all the interference outside the cell.

For CoMP, one or more interference measurement resources can be defined to capture the interference for a hypothetical CoMP scheme. At least one Interference Measurement Resource (IMR) (also referred to as a CSI-interference measurement (IM) resource or CSI-IM resource) can be configured for a Release-11 UE. A maximum of only one or multiple IMRs may be configured for a Release-11 UE. Each IMR may consist of only REs, which can be configured as Release 10 CSI-RS resources.

For support of CoMP, new CSI-RS configurations are defined and signaled by higher layers as described herein in accordance with the various embodiments of the present disclosure. In Release-10 and, more specifically, 3GPP TS 36.331, CSI-RS configuration is signaled as follows, where a single non-zero power CSI-RS and its parameters are indicated, while multiple zero-power CSI-RS configurations are indicated using a bitmap.

With one or more interference measurement resources supported for CoMP, CSI measurement is based on both a CSI-RS resource and an IMR or CSI-IM resource. As a result, embodiments of the present disclosure define CSI configurations for feedback.

In various embodiments, if the UE is configured with multiple IMR resources, the CSI configurations can be defined as illustrated in Table 1 below, each with an associated (CSI-RS resource index, IMR resource index) pair. Each CSI configuration may be for a particular TP or CSI process.

TABLE 1

| CSI Configuration | CSI-RS Resource Index | IMR Resource Index |
|---|---|---|
| Configuration 1 | X1 | Y1 |
| Configuration 2 | X2 | Y2 |

In various embodiments, the IMR resource index may be based on one of the currently defined 16 CSI-RS resource configurations that are used for zero-power CSI-RS in Release-10 based on a 4Tx CSI-RS pattern (e.g., such as the four CSI reference signal column in Table 6.10.5.2-1. of 36.211).

In other embodiments, an antenna port count can be additionally indicated to allow configuration of any of the 1 or 2, 4, 8 Tx patterns. In other embodiments, instead of indicating antenna port count, the configuration of any of the 1 or 2, 4, 8 Tx patterns can be allowed by using an aggregate bit field, i.e., a single bit field to indicate a total of 32 (1 or 2 Tx)+16 (4Tx)+8 (8 Tx)=56 patterns. Multiple such CSI configurations can be defined for a UE for CSI feedback purposes.

In other embodiments, a single IMR resource can be configured, while the multiple CSI-RS resources are configured separately. In this case, each CSI-RS configuration is defined by the associated CSI-RS resource and at least the common IMR resource. The whole set of configurations (1, 2, 4, 8 Tx) patterns may be using either an antennaportscount parameter or an aggregate IMRresourceconfig parameter.

In some embodiments, one or more IMR resources may be configured using the definitions above. In some embodiments, a list of IMR resources can be set up using a single field. In other embodiments, an interference measurement hypothesis may be based on at least one IMR resource and at least one non-zero power CSI-RS resource. In this case, the UE is expected to measure interference on an IMR resource by just summing or averaging received signal power contribution of corresponding REs. For deriving the interference measurement component from non-zero power CSI-RS resources, the UE performs channel estimation and derives the interference power based on the sum or average power of the CSI-RS ports corresponding to the non-zero-power CSI-RS resource.

Table 2 below illustrates an example with an IMR resource Y as configured in the examples above. Such CSI configuration may be set up differently for periodic and aperiodic feedback modes.

TABLE 2

| CSI Configuration | CSI-RS Resource Index | IMR Resource configuration (IMR Resource Index, Non Zero Power CSI-RS Resource Configuration Index) |
| --- | --- | --- |
| Configuration 1 | X1 | (Y, Z1) |
| Configuration 2 | X2 | (Y, Z2) |

The non-zero power CSI-RS (Z1, Z2) resources used may be implicitly known by the UE based on the feedback mode or explicitly configured as in Table 2 above. In one example for implicit configuration, the non-zero power CSI-RS resources (Z1 for configuration 1) used for interference measurement may include some or all of the non-zero power CSI-RS configured for that UE. In another example, the non-zero power CSI-RS resources used for interference measurement for a CSI configuration may be implicitly based on the corresponding CSI-RS resource index (X1 for configuration 1). An example of such a method is that the non-zero power CSI-RS resources (Z1) used for interference measurement are all the configured CSI-RS resources for that UE except X1. In another example, the non-zero power CSI-RS resources (Z1) used for interference measurement may be all the CSI-RS resources configured for that UE except those corresponding to the CSI configurations for that UE (i.e., X1, X2). For example, (X1, X2) may be considered a reporting set, while X1 may be considered a transmission set for CSI purposes.

In various embodiments, the PDSCH is not mapped to the REs corresponding to the configured IMR resource(s). The rules for PDSCH mapping to resource elements are outlined in section 6.3.5 of 36.211. Embodiments of the present disclosure include that for each of the antenna ports used for transmission of the physical channel, the block of complex-valued symbols $y^{(p)}(0), \ldots, y^{(p)}(M_{symb}^{ap}-1)$ shall conform to the downlink power allocation specified in section 5.2 and be mapped in sequence starting with $y^{(p)}(0)$ to resource elements (k,l) which, among other criteria, are not used for transmission of IMR reference signals and the DCI associated with the downlink transmission uses the C-RNTI or semi-persistent C-RNTI.

In addition to the CSI and IMR (or CSI-IM resource) configurations, embodiments of the present disclosure also provide CQI definitions. In one example, the CQI definition is modified as follows. In the CSI reference resource, the UE shall assume the following for the purpose of deriving the CQI index, and if also configured, PMI and RI: the first 3 OFDM symbols are occupied by control signaling; no resource elements used by primary or secondary synchronization signals or PBCH; CP length of the non-MBSFN subframes; Redundancy Version 0; if CSI-RS is used for channel measurements, the ratio of PDSCH EPRE to CSI-RS EPRE is as given in Section 7.2.5 of 3GPP TS 36.213. Additionally, for transmission mode x, which is a new transmission mode defined to enable CoMP support for LTE, CSI reporting: CRS REs are as in non-MBSFN subframes; if the UE is configured for PMI/RI reporting, the UE-specific reference signal overhead is consistent with the most recent reported rank; and PDSCH signals on antenna ports {7 . . . 6+v} for vlayers results in signals equivalent to corresponding symbols transmitted on antenna ports {$a_1 \ldots a_P$} of the CSI-RS resource, as given by $$\begin{bmatrix} y^{a_1} \\ \vdots \\ \vdots \\ y^{a_P} \end{bmatrix} = W(i) \begin{bmatrix} x^{(0)}(i) \\ \vdots \\ \vdots \\ x^{(v-1)}(i) \end{bmatrix},$$

where $x(i)=[x^0(i) \ldots x^{(v-1)}(i)]^T$ is a vector of symbols from the layer mapping in section 6.3.3.2 of 3GPP TS 36.211, P∈{1, 2, 4, 8} is the number of CSI-RS ports configured for the CSI-RS resource, and if only one CSI-RS port is configured, W(i) is 1, otherwise W(i) is the precoding matrix corresponding to the reported PMI applicable to x(i). The corresponding PDSCH signals transmitted on antenna ports {$a_1 \ldots a_P$} has a ratio of EPRE to CSI-RS EPRE equal to the ratio given in section 7.2.5 of 3GPP TS 36.213. If IMR based interference measurement is configured for the UE, assume the interference is the sum of interference observed on the IMR resource and one or more non-zero power CSI-RS resources configured for the CQI measurement (i.e., associated with the CSI request or higher layer configuration), where the individual contributions are obtained as: for interference measurement based on a non-zero power CSI-RS resource, the interference is based on the [average] received power on the reference signals corresponding to the CSI-RS antenna ports of the CSI-RS resource; and for interference measurement based on an IMR resource, the interference measurement is the total power (or average power) observed on the REs corresponding to the IMR resource. Further, in the CSI reference resource, the UE shall assume the following for the purpose of deriving the CQI index, and if also configured, PMI and RI: no REs allocated for CSI-RS and zero-power CSI-RS and IMR resources; no REs allocated for PRS; and the PDSCH transmission scheme given by Table 7.2.3-0 of 3GPP TS 36.213, depending on the transmission mode currently configured for the UE (which may be the default mode).

In various embodiments, the interference measurement may only be performed if an IMR resource is configured by higher layers. In this case, the condition for interference measurement in the CQI definition can be modified as if at least one IMR resource is configured by higher layers for the UE. In other embodiments, if the CSI configuration corresponding to the CQI requested as part of a periodic feedback mode or an aperiodic CSI request has a configured IMR resource, then interference measurement may be defined with the condition if at least one IMR resource is configured as part of the periodic CSI configuration or aperiodic CSI request. If interference measurement based on a non-zero power CSI-RS resource is not supported, then the text in the CQI definition can be modified as if IMR based interference measurement is configured for the UE, assume the interference is based on an IMR resource, where the interference is the total power (or average power) observed on the REs corresponding to the IMR resource. The same or similar modifications outlined above may be applied to this case as well for the condition to trigger IMR based interference assumption.

In accordance with the above definitions for multiple CSI and/or IMR configurations, embodiments of the present disclosure provide for periodic feedback modes based on the PUCCH. Periodic feedback modes are based on semi-persistent configuration of uplink control information on the PUCCH channel. These feedback modes are configured with a certain periodicity and offset. The supported feedback modes, individual report types, and timing configuration (periodicity, offset) are summarized in 3GPP TS 36.213 Table 7.2.2-1. Additionally, various CQI/PMI and RI reporting types with distinct periods and offsets are supported for the PUCCH CSI reporting modes as given in 3GPP TS 36.213 Table 7.2.2-3.

For each serving cell, the periodicity $N_{pd}$ (in subframes) and offset $N_{OFFSET,CQI}$ (in subframes) for CQI/PMI reporting are determined based on the parameter cqi-pmi-Config-Index ($I_{CQI/PMI}$) given in 3GPP TS 36.213 Table 7.2.2-1A for frequency division duplex (FDD) and 3GPP TS 36.213 Table 7.2.2-1C for time division duplex (TDD). The periodicity $M_{RI}$ and relative offset $N_{OFFSET,RI}$ for RI reporting are determined based on the parameter ri-ConfigIndex ($I_{RI}$) given in 3GPP TS 36.213 Table 7.2.2-1B. Both cqi-pmi-ConfigIndex and ri-ConfigIndex are configured by higher layer signaling. The relative reporting offset for RI $N_{OFFSET,RI}$ takes values from the set $\{0, -1, \ldots, -(N_{pd}-1)\}$. If a UE is configured to report for more than one CSI subframe set, then parameter cqi-pmi-ConfigIndex and ri-ConfigIndex respectively correspond to the CQI/PMI and RI periodicity and relative reporting offset for subframe set 1 and cqi-pmi-ConfigIndex2 and ri-ConfigIndex2 respectively correspond to the CQI/PMI and RI periodicity and relative reporting offset for subframe set 2.

As an example, the wideband CQI/PMI reporting timing is defined as follows based on configured timing parameters. Similar definitions are defined in 36.213 for other report types. In the case where wideband CQI/PMI reporting is configured: the reporting instances for wideband CQI/PMI are subframes satisfying $(10 \times n_f + \lfloor n_s/2 \rfloor - N_{OFFSET,CQI}) \mod (N_{pd}) = 0$. In case RI reporting is configured, the reporting interval of the RI reporting is an integer multiple $M_{RI}$ of period $N_{pd}$ (in subframes). The reporting instances for RI are subframes satisfying $(10 \times n_f + \lfloor n_s/2 \rfloor - N_{OFFSET,CQI} - N_{OFFSET,RI}) \mod (N_{pd} \cdot M_{RI}) = 0$.

To support CoMP transmissions, embodiments of the present disclosure set up feedback corresponding to more than one CSI-RS configurations (resources, CSI processes, or TPs) and define new feedback modes for this purpose. As used herein, a CSI configuration means a (CSI-RS resource, IMR resource) pair. However, with a single IMR resource, a CSI configuration may be simply replaced by the CSI-RS resource.

In one embodiment, independent periodic PUCCH for multiple CSI configurations is provided. In this embodiment, the periodic feedback mode parameters are set up independently for two or more CSI configurations. This embodiment is suitable, for example, when no inter-CSI-RS feedback is needed. Inter-CSI-RS resource feedback refers to feedback which relies on measurement of more than one CSI-RS resource. Additional examples of inter-CSI-RS resource feedback are described below.

When two or more periodic reports are configured, the timing parameters chosen may result in a collision of certain reports. Such a collision may be avoidable sometimes by the appropriate choice of parameters by the scheduler, but may not always be avoidable due to scheduling flexibility issues. Embodiments of the present disclosure provide different ways to handle such a collision. The methods and embodiments described below can also apply to UEs configured with multiple component carriers when two or more periodic CSIs reporting for the multiple component carriers are scheduled in a same subframe.

In various embodiments, only one of the reports may be sent and remaining reports may be dropped (i.e., not transmitted). In this situation, dropping rules are defined, which are clear to both the UE and the eNB. In one embodiment, in case of collision between two PUCCH reports for different CSI-RS resources, the UE may drop the feedback based on report type. In one embodiment, the report to be transmitted is selected based on the report type. For example, an RI report may be considered more useful than other CQI/PMI reports, and a wideband CQI/PMI report may be prioritized over a subband CQI/PMI report. In such a case, a priority order is defined for each report. As an example, reporting types 3, 5, or 6 may have higher priority over reporting types 1, 1a, 2, 2a, 2b, 2c, or 4. So, if a report type for a first CSI-RS resource is type 3 and report type for a second CSI-RS resource is type 1, then the report corresponding to the first CSI-RS resource is prioritized to be sent.

In another embodiment, in case of collision between two PUCCH reports for different CSI-RS resources, the UE may drop the feedback based on CSI-RS transmission. As discussed above, each CSI-RS resource has a unique subframe configuration parameterized by a periodicity and timing offset when the corresponding CSI-RS are sent. In one method, the reports corresponding to different CSI-RS resources are prioritized based on the timing relationship with past CSI-RS transmissions of the corresponding resources. In another method, the report corresponding to the CSI-RS resource with the most recent CSI-RS transmission is prioritized, since the corresponding CSI is more useful (considering time variation of CSI).

In another embodiment, in case of collision between two PUCCH reports for different CSI-RS resources, the UE may drop the feedback based on the CSI-RS resource with best performance. In one method, the report corresponding to the CSI-RS resource is prioritized based on the performance attributed to the CSI-RS resource. In one method, the prioritization may be based on CQI (wideband or subband). Since the network may not be aware of the current CQI, in one method, an index of the chosen CSI-RS resource is reported. In another method, to avoid additional reporting, the prioritization may be based on the most recently reported wideband CQI of each report. In another method, other feedback parameters may also be used like RI as a performance metric. In another method, the choice of the CSI-RS for reporting may be based on the corresponding RSRP or RSRQ if an RSRP type metric can be associated with a CSI-RS configuration. Such RSRP may be separately reported by the UE and known to eNB.

In another embodiment, in case of collision between two PUCCH reports for different CSI-RS resources, the UE may drop the feedback based on the CSI-RS resource index. In one method, the prioritization of a report corresponding to a CSI-RS resource may be simply based on the CSI-RS resource index. Multiple CSI-RS resources are configured by RRC (higher layer) signaling, thereby implicitly associating an index (from the signaled order) to each of the CSI-RS resources. This allows the network to prioritize a CSI-RS resource by network configuration. Such prioritization/indexing may be affected by the scheduling aspects and/or signal strength measured by the network for the corresponding CSI-RS resource.

In another embodiment, in case of collision between two PUCCH reports for different CSI-RS resources, the UE may drop the feedback based on reporting mode parameters. In one method, the prioritization of the reports is based on the feedback mode setup parameters like periodicity and offset (Npd, Noffset).

In other embodiments, when the multiple CSI reports corresponding to two or more CSI-RSs collide, all the CSI reports are multiplexed and sent together. Different approaches can be used for multiplexing. For example, the reports may be multiplexed based on PUCCH Format 3. Though the individual reports are transmitted based on different PUCCH formats, in the event of collision, multiple reports are multiplexed into a single report using the higher capacity PUCCH channel format 3, which can support <=22 bits. In one method, when more than three reports collide, two of the reports are multiplexed and the rest of the reports are dropped. The prioritization for selecting the multiplexed reports and the dropped reports may follow one or more dropping rules discussed previously. In another method, the number of reports multiplexed is such that they can be supported by the format size of the PUCCH format 3. For example, three RI reports (<=3 bits each) can be accommodated in a single PUCCH Format 3 report. In one method, whether to multiplex using PUCCH Format 3 or drop the reports (except one) may be based on the link quality of the UE. In one method, whether to multiplex using PUCCH Format 3 or drop the reports (except one) may be configured by higher layers.

In other examples, whether the reports are to be multiplexed may be conditioned on the physical uplink shared channel (PUSCH). The network may control the behavior in the event of collision. In one method, a PUSCH resource may be scheduled for the UE for transmission on uplink control information (UCI) (or CSI) in that sub-frame. If a UL grant for such a PUSCH resource is detected, the UE transmits the multiplexed report on the PUSCH (which has a larger capacity than PUCCH). If no grant for PUSCH resource is detected, the UE simply drops one or more reports, for example, according to the dropping rules described above. More generally, the multiplexing/dropping behavior may be based on the configuration and the size of the PUSCH resource (e.g., two or three reports may be multiplexed based on the PUSCH resource size and/or configuration).

The network may also semi-statically configure PUSCH resources, since the network is aware of the collision instances. In such examples, if a PUSCH resource is configured in a sub-frame with collision event, multiplexing of reports may be used. Otherwise, CSI dropping may be used, for example, according to the dropping rules described above. If the UL grant for such a configured PUSCH resource has non-zero value for a CSI request field, then a periodic CSI report as configured by CSI request is transmitted and periodic CSI is dropped. If the UL grant for such a configured PUSCH resource has zero value for CSI request field, and in the event of collision of two or more CSI reports, then the periodic CSI report is sent by multiplexing the CSI reports as described above. In one method, even if simultaneous transmission of PUCCH and PUSCH is configured, in case of collision of periodic CSI reports, both the CSI and data are multiplexed on PUSCH.

In some cases, other control information on the uplink, such as ACK/NACK feedback, may collide with CSI. In this case, the dropping and multiplexing rules may be further modified by such an event. In one method, if the UE is configured with simultaneous PUCCH/PUSCH transmission, in the event of collision of periodic PUCCH CSI reports, the CSI is transmitted on a scheduled PUSCH resource and ACK/NACK is transmitted on the PUCCH resource configured for ACK/NACK (e.g., PUCCH format 1a/1b/3). If the UE is not configured for simultaneous PUCCH/PUSCH transmission and in the event of collision of periodic PUCCH CSI reports, the CSI and ACK/NACK are transmitted on a scheduled PUSCH.

In other examples, whether the reports are to be multiplexed may be based on semi-statically configured PUCCH Format 3. In one method, a network may semi-statically configure a PUCCH Format 3 resource, since the network is aware of the collision instances. If such a configured PUCCH Format 3 resource is available, a UE may multiplex the CSI in the configured PUCCH Format 3 or drop CSIs according to the dropping rules described above.

In some cases, other control information on the uplink like ACK/NACK feedback may collide with CSI. In this case, the dropping and multiplexing rules may be further modified by such an event. In one method, if an ACK/NACK (or SR) collides with CSI, one or more of the CSI may be multiplexed with the ACK/NACK using PUCCH Format 3 configured for ACK/NACK. In another method, if an ACK/NACK (or SR) collides with CSI, one or more of the CSI may be multiplexed with the ACK/NACK using PUCCH Format 3 configured for CSI. This behavior may be dependent upon the higher-layer configured value of simultaneousAckNackAndCQI. For example, ACK/NACK and CSI may be multiplexed if simultaneousAckNackAndCQI=TRUE, while only ACK/NACK is transmitted on the PUCCH Format 3 configured for ACK/NACK with dropping CQI if simultaneousAckNackAndCQI=FALSE. In another method, if the UE is configured with simultaneous PUCCH/PUSCH transmission, in the event of collision of periodic PUCCH CSI reports in a subframe in which a PUSCH is scheduled, the CSI is transmitted on a scheduled PUSCH resource and ACK/NACK is transmitted on the PUCCH resource configured for ACK/NACK. If the UE is not configured with simultaneous PUCCH/PUSCH transmission, in the event of collision of periodic PUCCH CSI reports in a subframe in which a PUSCH is scheduled, the CSI and ACK/NACK are transmitted on a scheduled PUSCH resource.

Embodiments of the present disclosure provide joint configuration of multiple periodic reports. In various embodiments, in the presence of some reports that carry inter-CSI-RS resource feedback, setup of a single PUCCH feedback mode is preferred. Some examples of such inter-CSI-RS resource feedback may include a single RI feedback. For example, the network may require a single RI report for two or more CSI-RS resources that feedback is requested for. Such alignment of rank enables a network to perform joint transmission based on per-CSI-RS resource feedback.

Another example of such inter-CSI-RS resource feedback may include aggregate CQI feedback. Aggregate CQI is the CQI assuming joint transmission from one or more transmission points. Another example of such inter-CSI-RS resource feedback may include aggregate PMI. Aggregate PMI is the PMI assuming joint transmission from one or more transmission points. Another example of such inter-CSI-RS resource feedback may include inter-TP phase feedback. The phase feedback corresponding to phase alignment between two CSI-RS resources for joint transmission.

In various embodiments, feedback modes are defined for two or more CSI-RS resource joint feedback configuration according to Table 3 below.

TABLE 3

|  |  | (PMI Feedback Type, CoMP Feedback Type) | | | |
| --- | --- | --- | --- | --- | --- |
|  |  | No PMI, One CSI-RS Resource | Single PMI, One CSI-RS Resource | No PMI, Two CSI-RS Resource | Single PMI, Two CSI-RS resource |
| PUCCH CQI Feedback Type | Wideband (wideband CQI) | Mode 1-0 | Mode 1-1 | Mode 1-4 | Mode 1-5 |
|  | UE Selected (subband CQI) | Mode 2-0 | Mode 2-1 | Mode 2-4 | Mode 2-5 |

Figure 6:
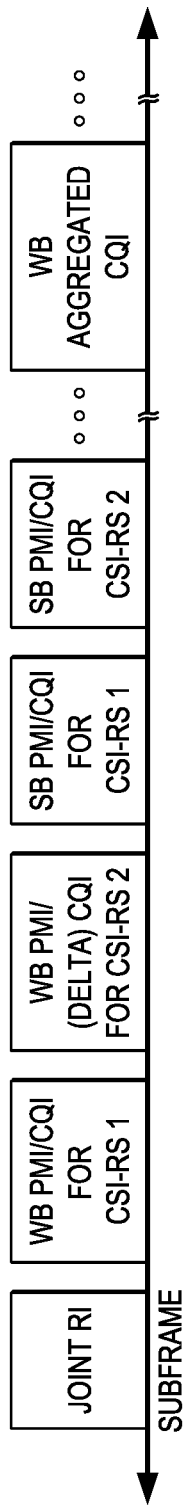
FIG. 6 illustrates feedback reporting corresponding to multiple CSI-RS resources which may be multiplexed in time in accordance with an exemplary embodiment.

FIG. 6 illustrates feedback reporting corresponding to multiple CSI-RS resources, which may be multiplexed in time in accordance with an exemplary embodiment. In this illustrative embodiment, independent reports are multiplexed (i.e., an independent report type (e.g., wideband CQI associated with each CSI-RS resource) is configured with a single set of periodicity/offset parameters across all CSI-RS resources). New report types, like aggregate CQI, are transmitted with the correspondingly-defined timing parameters (e.g., $Nd_{aggregateCQI}$, $Noffset_{aggregateCQI}$).

Figure 7:
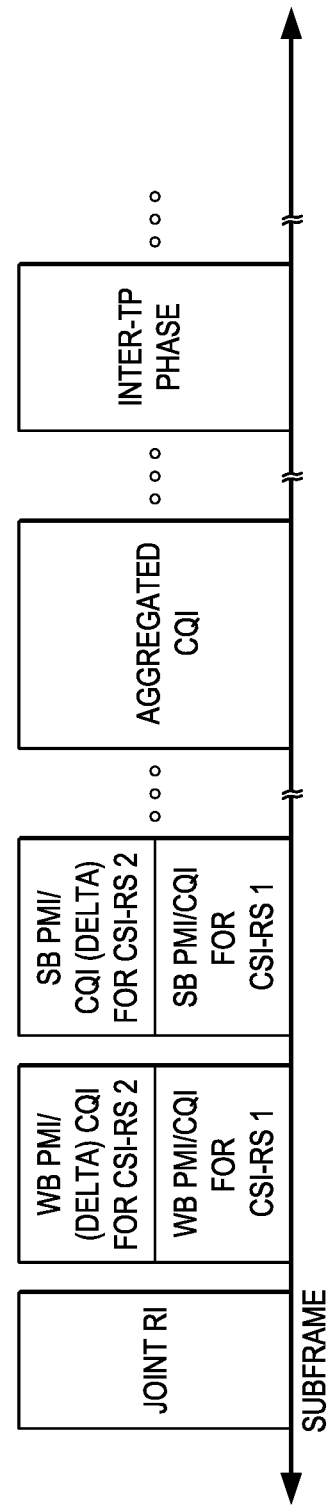
FIG. 7 illustrates feedback reporting for multiple CSI-RS resources which may be configured together for certain report types in accordance with an exemplary embodiment.

FIG. 7 illustrates feedback reporting for multiple CSI-RS resources, which may be configured together for certain report types in accordance with an exemplary embodiment. In this illustrative embodiment, reports for multiple CSI-RS resources may be configured together for certain report types, such as wideband/subband CQI or wideband/subband PMI. Further, the CQIs may be jointly encoded with differential encoding. In such a case, PUCCH Format 3 may be used for transmission of such new report type. The inter-CSI-RS resources CQIs, such as an aggregate CQI, are configured separately with their timing parameters (e.g., $Nd_{aggregateCQI}$, $Noffset_{aggregateCQI}$). In various embodiments, one or more of the report types (e.g., aggregate CQI, inter-TP phase) can be made configurable within a single mode. Such configuration may be indicated by RRC configuration as a submode parameter for that mode.

Figure 8A:
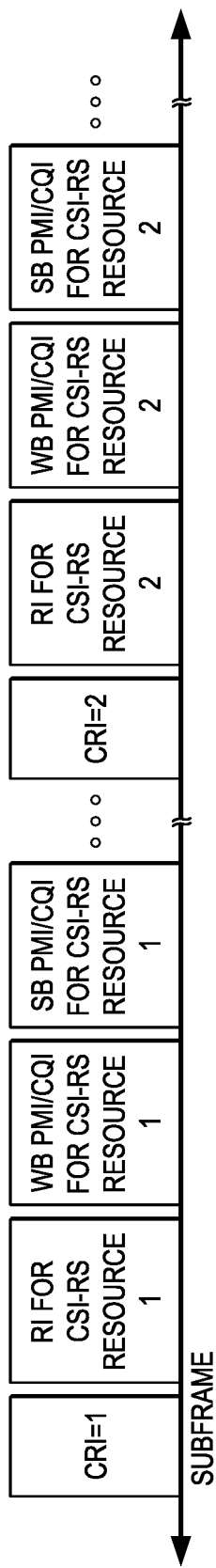
FIGS. 8A and 8B illustrate examples of a single periodic PUCCH configured with UE autonomous TP switching in accordance with illustrative embodiments of the present disclosure.
Figure 8B:
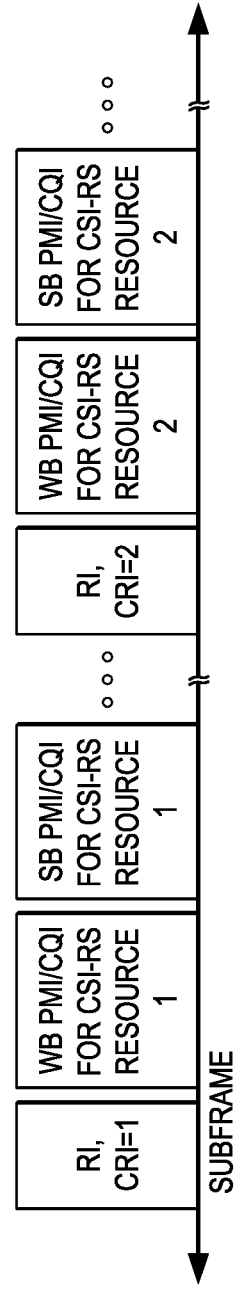

FIGS. 8A and 8B illustrate examples of a single periodic PUCCH configured with UE autonomous TP switching in accordance with illustrative embodiments of the present disclosure. In these embodiments, the UE may transmit the CSI corresponding to a single CSI-RS resource only. The choice of which CSI to transmit may be performed by the UE based on performance (e.g., CQI or RSRP). The UE measures the CSI of individual CSI-RS resources and switches between the reporting types based on the best CQI or RSRP. A CSI-RS Resource indicator (CRI) may be sent separately to indicate switching. FIG. 8A illustrates an example embodiment where the RI and CRI are separately signaled. FIG. 8B illustrates another example embodiment where the RI and CRI are jointly encoded.

Various embodiments of the present disclosure provide indications of CQI reference resource and interference measurement resource. A CSI reference resource is the resource that UE's feedback should correspond to. The UE implementation is not precluded from averaging over "similar" subframes. Interference measurement in Release-10 relies on CRS that are available in every subframe. Hence, no reference to interference measurement is made in previous CSI reference resource definitions. 3GPP 36.213 section 7.2.3 provides a definition of the CSI reference resource.

In various embodiments, the network may explicitly indicate the IM resource for periodic CSI configuration. The IM resource (CSI-IM resource) index(es) and CSI-RS resource index(es) are associated with each PUCCH feedback mode configuration and may be explicitly indicated with RRC configuration for one or more periodic CSI configuration (or CSI processes) as illustrated in Table 4 below. As a result, the CSI reference resource definition may be modified to incorporate IM resource for periodic CSI reporting.

TABLE 4

| Periodic CSI Configuration | CSI-RS Resource Index | IMR Index |
| --- | --- | --- |
| Configuration | X | Y |

In some embodiments, the reference subframe may be defined without reference to the interference measurement. Interference may be based on measurements on the subframes with configured IMR resource(s). It is assumed that UE performs interpolation/extrapolation of interference if the reference subframe does not include corresponding IMR resource(s).

FIGS. 9A and 9B illustrate examples of a reference subframe with configuration of IMR and CSI subframe subsets in accordance with various embodiments of the present disclosure. In this illustrative embodiment, the downlink transmissions to the UE have at least two different subsets, such as with enhanced Intercell Interference Coordination (eICIC), or other transmission modes (e.g., transmission mode 10). For such subframe subsets, the interference measurement is on the corresponding subframe subset as configured for that CSI request (i.e., the interference measurement is an element of the CSI subframe set linked to the periodic CSI report when that UE is configured with CSI subframe sets). In other words, the configured CSI-LM resource within the subframe subset belonging to the CSI reference resource is used to derive the interference measurement.

For example, as illustrated in FIG. 9A, two different types of subframe subsets 905 and 910 are present within the downlink subframes 900 transmitted to the UE. Within each of the subframe subsets, the network configures IM resources 915 and 920 within the respective subframe subsets 905 and 910. For feedback reporting in the UCI transmission 925, the UE uses the subframe subset belonging to the CSI reference resource to derive the interference measurement. As illustrated, for the CSI reference resource (i.e., $n_{CQI\_ref}$) being in subframe subset 905 (i.e., in subframe 905a), the UE uses the IM resource 915 in the subframe 905a (which is part of subframe subset 905) to derive the interference measurement. For example, the UE measures interference using the IM resource 915 to calculate a CQI value or values which are then reported as feedback in the UCI transmission 925. Even though the IM resource 920 in subframe 910d may be closer in time or frequency to the UCI transmission 925, the UE still uses the configured IM resource within the subframe subset belonging to the CSI reference resource to derive the interference measurement.

In another example, as illustrated in FIG. 9B, two different types of subframe subsets 955 and 960 are present within the downlink subframes 950 transmitted to the UE. Within each of the subframe subsets, the network configures IM resources 965 and 970 within the respective subframe subsets 955 and 960. For feedback reporting in the UCI transmission 975, the UE uses the subframe subset belonging to the CSI reference resource to derive the interference measurement. As illustrated, for the CSI reference resource (i.e., $n_{CQI\_ref}$) being in subframe subset 955 (i.e., in subframe 955b), the UE uses the IM resource 965 in the subframe 955a (which is part of subframe subset 955) to derive the interference measurement. For example, the UE measures interference using the IM resource 965 to calculate a CQI value or values which are then reported as feedback in the UCI transmission 975. Even though the IM resource 970 in subframe 960c may be closer in time or frequency to the UCI transmission 975, the UE still uses the configured IM resource within the subframe subset belonging to the CSI reference resource to derive the interference measurement.

Additionally, because the processing of the interference measurement (e.g., receiving the IM resource symbol, measuring interference, calculating a corresponding CQI value or values, etc.) may take time, the UE may actually pass up some configured IM resource that occurs closer in time to the UCI transmission 925 or 975 in order to insure accurate and timely reporting of the feedback associated with the interference measurement. The downlink and uplink transmissions illustrated in FIGS. 9A and 9B may be implemented in a TDD or FDD system.

In one illustrative embodiment, with the IM resource configuration, the reference subframe is based on the intersection of the IM resource and the CSI subframe subset. This can be achieved by further modifying the definition of a valid downlink subframe. For example, in the time domain, the CSI reference resource may be defined by a single downlink subframe $n-n_{CQI\_ref}$, where, for periodic CSI reporting, $n_{CQI\_ref}$ is the smallest value greater than or equal to 4, such that it corresponds to a valid downlink subframe. Additionally, a downlink subframe in a serving cell shall be considered to be valid if: the downlink subframe is configured as a downlink subframe for that UE; except for transmission mode 9, the downlink subframe is not an MBSFN subframe; the downlink subframe does not contain a DwPTS field in case the length of DwPTS is $7680 \cdot T_s$ and less; the downlink subframe does not fall within a configured measurement gap for that UE; and for periodic CSI reporting, it is an element of the CSI subframe set linked to the periodic CSI report when that UE is configured with CSI subframe sets and an element of a subframe set of the interference measurement resource linked to the periodic CSI report if the UE is configured with interference measurement resources.

With PUSCH based aperiodic feedback modes, higher UCI overhead may be supported than PUCCH based periodic feedback modes, whose capacity is limited by that supported by Format 3 (22 bits). This is suited for transmission of UCI corresponding to multiple CSI-RS resources in CoMP. Aperiodic feedback modes are captured provided in 3GPP TS 36.213. If no inter-CSI-RS resource feedback is supported, then no new modes need to be defined for aperiodic CSI. DCI Format 0 (or 4) supports a "CSI request field", which indicates whether aperiodic CSI is turned on and on which cells (e.g., carriers) CSI is to be reported as shown in Table 7.2.1-1A of 3GPP TS 36.213.

Similarly, a CSI request may be needed to indicate the set of CSI-RS resources for CoMP. In one exemplary embodiment, an independent CSI request field is defined for CoMP according to Table 5 below.

TABLE 5

| Value of CSI request field | Description |
| --- | --- |
| '00' | No aperiodic CSI report is triggered |
| '01' | Aperiodic CSI report is triggered for CSI-RS resource 1 (or any configured fixed CSI-RS resource or CSI configuration) |
| '10' | Aperiodic CSI report is triggered for a $1^{st}$ set of CSI-RS resources (or CSI configurations) configured by higher layers |
| '11' | Aperiodic CSI report is triggered for a $2^{nd}$ set of CSI-RS resources (or CSI configurations) configured by higher layers |

In another embodiment, a jointly encoded CSI request field may be used. An example with 2-bit encoding is illustrated in Table 6 below. In this example, CoMP is only supported on the serving cell. The serving cell may be replaced by any fixed cell on which CoMP is configured.

TABLE 6

| Value of CSI request field | Description |
| --- | --- |
| '00' | No aperiodic CSI report is triggered |
| '01' | Aperiodic CSI report is triggered for serving cell c and $1^{st}$ set of CSI-RS resources (or CSI configurations) configured by higher layers on serving cell c |
| '10' | Aperiodic CSI report is triggered for serving cell c and $2^{nd}$ set of CSI-RS resources (or CSI configurations) configured by higher layers on serving cell c |
| '11' | Aperiodic CSI report is triggered for a $1^{st}$ set of serving cells configured by higher layers (based on a single CSI-RS resource per each cell that is configured by higher layers) |

The set of feedback modes in Table 7.2.1-1A of 3GPP TS 36.213 can be reused, and if more than one CSI-RS resources are configured, the UE aggregates the per-CSI-RS feedback corresponding to the modes configured on each CSI-RS resource. For example, if mode 1-2 is configured on CSI-RS resource 1 and mode 2-2 on CSI-RS resource 2, the UE aggregates corresponding CSI.

In other embodiments, some inter-CSI-RS feedback may be supported. Examples of inter-CSI-RS feedback include: aligned RI feedback, aggregate CQI feedback, aggregate PMI, and inter-TP phase feedback.

In one exemplary embodiment, the aperiodic modes are defined for CoMP with two CSI-RS resources when one or more inter-CSI-RS resource feedback modes are supported as illustrated in Table 7 below.

TABLE 7

| | | (PMI Feedback Type, CoMP Feedback Type) | | | | | |
|---|---|---|---|---|---|---|---|
| | | No PMI, Single CSI-RS Resource | Single PMI, Single CSI-RS Resource | Multiple PMI, Single CSI-RS Resource | No PMI, Two CSI-RS Resource | Single PMI, Two CSI-RS Resource | Multiple PMI, Two CSI-RS Resource |
| PUSCH CQI Feedback Type | Wideband (wideband CQI) | | | Mode 1-2 | | | Mode 1-5 |
| | UE Selected (subband CQI) | Mode 2-0 | | Mode 2-2 | Mode 2-3 | | Mode 2-5 |
| | Higher Layer-configured (subband CQI) | Mode 3-0 | Mode 3-1 | | Mode 3-3 | Mode 3-4 | |

The individual mode definitions and methods to support inter-CSI-RS resource feedback are further described below. The CSI configuration is defined above and may be used interchangeably with CSI-RS resources (if they share the same interference measurement resource configuration).

The mode 2-3 is for a UE-selected subband feedback for two CSI configurations. In this feedback mode, the UE selects a first set of M preferred subbands of size k (where k and M are given in Table 7.2.1-5, 36.213 for each system bandwidth range) within the set of subbands S for the first CSI configuration. The UE selects a second set of M preferred subbands of size k within the set of subbands S for the second CSI configuration. The UE also reports one CQI value reflecting transmission only over the first M selected subbands determined in the previous step for the first CSI configuration and another CQI value reflecting transmission only over the second M selected subbands determined in the previous step for the second CSI configuration. Each CQI represents channel quality for the first codeword of the corresponding CSI configuration, even when RI>1. Additionally, the UE reports one wideband CQI value, which is calculated assuming transmission on set S subbands for each CSI configuration. The wideband CQI represents channel quality for the first codeword of the corresponding CSI configuration, even when RI>1.

For the same rank, in one example, a single RI is reported for both CSI configurations. For transmission mode 3, the reported CQI values are calculated conditioned on the reported RI. For other transmission modes, the reported CQI values are reported conditioned on rank 1.

For wideband aggregate CQI, in one example, the UE also reports one wideband aggregate CQI value, which is calculated assuming joint transmission on set S subbands from the two CSI resources. In another example, the aggregate CQI is differentially encoded with the per-CSI-RS wideband CQI.

For a wideband inter-CSI-RS phase, in one example, the UE reports a wideband inter-CSI-RS resource phase feedback corresponding to the two CSI-RS resources of the two CSI configurations.

The mode 3-3 is for higher layer configured subband feedback for two CSI configurations. In this feedback mode, a UE reports a wideband CQI value which is calculated assuming transmission on set S subbands per CSI configuration. The UE also reports one subband CQI value for each set S subband and each CSI configuration. The subband CQI value is calculated assuming transmission only in the subband. Both the wideband and subband CQI represent channel quality for the first codeword, even when RI>1.

For the same rank, in one example, a single RI is reported for both CSI configurations. For transmission mode 3, the reported CQI values are calculated conditioned on the reported RI. For other transmission modes, the reported CQI values are reported conditioned on rank 1.

For wideband aggregate CQI, in one example, the UE shall also report one wideband aggregate CQI value, which is calculated assuming joint transmission on set S subbands from the two CSI resources. In another example, the aggregate CQI is differentially encoded with the per-CSI-RS wideband CQI.

For subband aggregate CQI, in one example, the UE shall also report one subband aggregate CQI value for each set S subband, which is calculated assuming joint transmission from the two CSI-RS resources. In another example, the subband aggregate CQI is differentially encoded with the wideband aggregate CQI. The subband differential aggregate CQI offset level is equal to the subband aggregate CQI index minus the wideband aggregate CQI index. A mapping of subband differential aggregate CQI value to offset level is provided in Table 8 below.

TABLE 8

| Subband differential CQI value | Offset level |
|---|---|
| 0 | 0 |
| 1 | 1 |
| 2 | ≥2 |
| 3 | ≤−1 |

The mode 3-4 is for higher layer configured subband PMI/CQI feedback for two CSI configurations. In this feedback mode, a single precoding matrix is selected for each CSI configuration from the codebook subset of the corresponding CSI configuration assuming transmission on set S subbands. A UE reports one subband CQI value per codeword for each set S subband and for each CSI configuration which is calculated assuming the use of the single precoding matrix corresponding to the CSI configuration in all subbands and assuming transmission in the corresponding subband. A UE reports a wideband CQI value per codeword per CSI configuration, which is calculated assuming the use of the single precoding matrix corresponding to the CSI configuration in all subbands and transmission on set S subbands. The UE reports the selected single precoding matrix indicator per CSI configuration except for transmission mode 9 with 8 CSI-RS ports configured in which case a first and second precoding matrix indicator are reported corresponding to the selected single precoding matrix per CSI configuration.

For the same rank, in one example, a single RI is reported for both CSI configurations. For transmission modes 4, 8, and 9, the reported PMI and CQI values are calculated conditioned on the reported RI. For other transmission modes, the reported PMI and CQI values are reported conditioned on rank 1.

For wideband aggregate CQI, in one example, a UE reports a wideband aggregate CQI value per codeword, which is calculated assuming joint transmission using the single precoding matrix corresponding to each CSI configuration in all subbands and transmission on set S subbands.

For subband aggregate CQI, in one example, a UE reports a subband aggregate CQI value per codeword for each set S subband, which is calculated assuming joint transmission using the single precoding matrix corresponding to each CSI configuration in the corresponding subband.

For wideband Inter CSI-RS resource phase, in one example, the UE shall report a wideband inter-CSI-RS resource phase feedback corresponding to the two CSI-RS resources corresponding to the CSI configurations assuming joint transmission on set S subbands.

For wideband aggregate CQI with phase feedback, in one example, a UE shall report a wideband aggregate CQI value per codeword, which is calculated assuming joint transmission using the single precoding matrix corresponding to each CSI configuration in all subbands, using the single wideband inter-CSI-RS resource phase feedback, and transmission on set S subbands.

For subband aggregate CQI with phase feedback, in one example, a UE shall report a subband aggregate CQI value per codeword for each set S subband, which is calculated assuming joint transmission using the single precoding matrix corresponding to each CSI configuration, using the single wideband inter-CSI-RS resource phase feedback in the corresponding subband. In another example, the subband aggregate CQI is differentially encoded with the wideband aggregate CQI.

The mode 1-5 is for wideband feedback for two CSI resources. In this feedback mode, for each subband, a preferred precoding matrix for each CSI configuration is selected from the codebook subset of the corresponding CSI configuration assuming transmission only in the subband. For each CSI configuration, a UE reports one wideband CQI value per codeword, which is calculated assuming the use of the corresponding selected precoding matrix in each subband and transmission on set S subbands. For each CSI configuration, the UE reports the selected precoding matrix indicator for each set S subband except for transmission mode 9 with 8 CSI-RS ports configured in which case a first precoding matrix indicator $i_1$ is reported for the set S subbands and a second precoding matrix indicator $i_2$ is reported for each set S subband. The subband size is defined in Table 7.2.1-3 in 3GPP TS 36.213.

For the same rank, in one example, a single RI is reported for both CSI configurations. For transmission modes 4, 8, and 9, the reported PMI and CQI values are calculated conditioned on the reported RI. For other transmission modes, the reported PMI and CQI values are reported conditioned on rank 1.

For subband inter-CSI-RS phases, in one example, an inter-CSI-RS phase is reported per subband for assuming transmission only in the subband.

For wideband aggregate CQI with subband inter-CSI-RS phase, in one example, a UE reports one aggregate wideband CQI value per codeword, which is calculated assuming joint transmission and the use of the corresponding selected precoding matrix in each subband, inter-CSI-RS phase per subband and transmission on set S subbands.

The mode 2-5 is for UE selected subband feedback for two CSI configurations and multiple PMI. In this feedback mode, the UE performs joint selection of the set of M preferred subbands of size k within the set of subbands S and a preferred single precoding matrix selected from the codebook subset that is preferred to be used for transmission over the M selected subbands. The M preferred subbands and the associated single precoding matrix are obtained for each CSI configuration. For each CSI configuration, the UE reports one CQI value per codeword reflecting transmission only over the corresponding selected M preferred subbands and using the same corresponding selected single precoding matrix in each of the M subbands. Except for transmission mode 9 with 8 CSI-RS ports configured, for each CSI configuration, the UE also reports the corresponding selected single precoding matrix indicator preferred for the M selected subbands. For each CSI configuration, a UE also reports the corresponding selected single precoding matrix indicator for all set S subbands. For transmission mode 9 with 8 CSI-RS ports configured, for each CSI configuration, a UE reports a corresponding first precoding matrix indicator for all set S subbands. For each CSI configuration, a UE also reports a corresponding second precoding matrix indicator for all set S subbands and another corresponding second precoding matrix indicator for the M selected subbands. For each CSI configuration, a single precoding matrix is selected from the codebook subset of the corresponding CSI configuration assuming transmission on set S subbands. For each CSI configuration, a UE reports an associated wideband CQI value per codeword, which is calculated assuming the use of the corresponding single precoding matrix in all subbands and transmission on set S subbands.

In one example, a single RI is reported for both CSI configurations. For transmission modes 4, 8, and 9, the reported PMI and CQI values are calculated conditioned on the reported RI. For other transmission modes, they are reported conditioned on rank 1.

For wideband aggregate CQI, in one example, a UE reports a wideband aggregate CQI value per codeword, which is calculated assuming joint transmission using the single precoding matrix corresponding to each CSI configuration in all subbands and transmission on set S subbands.

For wideband inter-CSI-RS resource phase, in one example, the UE reports a wideband inter-CSI-RS resource phase feedback corresponding to the two CSI-RS resources corresponding to the CSI configurations assuming joint transmission on set S subbands.

For wideband aggregate CQI with wideband phase, in one example, a UE reports a wideband aggregate CQI value per codeword, which is calculated assuming joint transmission using the single precoding matrix corresponding to each CSI configuration in all subbands, using the wideband inter-CSI-RS resource phase feedback, and transmission on set S subbands.

For selection of M subbands assuming joint transmission, in one example, the UE performs joint selection assuming joint transmission from two CSI configurations of the set of M preferred subbands of size k within the set of subbands S and a preferred single precoding matrix selected from the codebook subset for each CSI configuration that is preferred to be used for transmission over the M selected subbands.

For per-CSI-RS resource CQI over the selected M subbands, in one example, the UE reports one CQI value per codeword reflecting joint transmission only over the corresponding selected M preferred subbands for joint transmission and using the same corresponding selected single precoding matrix for each CSI configuration in each of the M subbands from the previous step.

For inter-CSI-RS phase for selected M subbands, in one example, the UE reports a single inter-CSI-RS resource phase feedback assuming joint transmission over the selected M preferred subbands for joint transmission.

For aggregate CQI on selected M subbands, in one example, the UE reports one aggregate CQI value per codeword reflecting joint transmission only over the corresponding selected M preferred subbands for joint transmission and using the corresponding selected single precoding matrix for each CSI configuration, and the selected single inter-CSI-RS resource phased feedback, in each of the M subbands.

In one example, the selected single RI for both CSI configurations, as defined in the above feedback modes, may be based on the CSI configuration with the largest wideband CQI. In another example, the selected single RI is based on the CSI configuration with the largest RI. In another example, the RI is based on one of the CSI configurations, which may be predefined or configured by higher layers or fixed (e.g., configuration 1).

For aggregate CQI, the assumed IM resource for interference measurement may be separately configured by higher layers or implicitly defined (e.g., measure all the interference other than the CSI-RS resources corresponding to the two CSI configurations).

If both the CSI configurations correspond to the same CSI-RS resource but different IMR resources, then some of the inter-CSI-RS resource feedback need not be supported. There is no need to report aggregate CQI, inter-CSI-RS phase feedback, or single rank feedback. In one example, if there is no need to report this feedback, then these reports may be dropped and instead replaced by other reports. For example, multiple rank feedback may be supported or CQI of the individual CSI configurations may be encoded differentially. However, if the CSI configurations share the same CSI resource, it may not be preferable to use the modes defined above. More generally, in each of the feedback modes defined, reports corresponding to more than two CSI configurations can be supported. Similar definitions for the inter-CSI-RS resource feedback may be used with simple extensions of definitions described herein.

Figure 10:
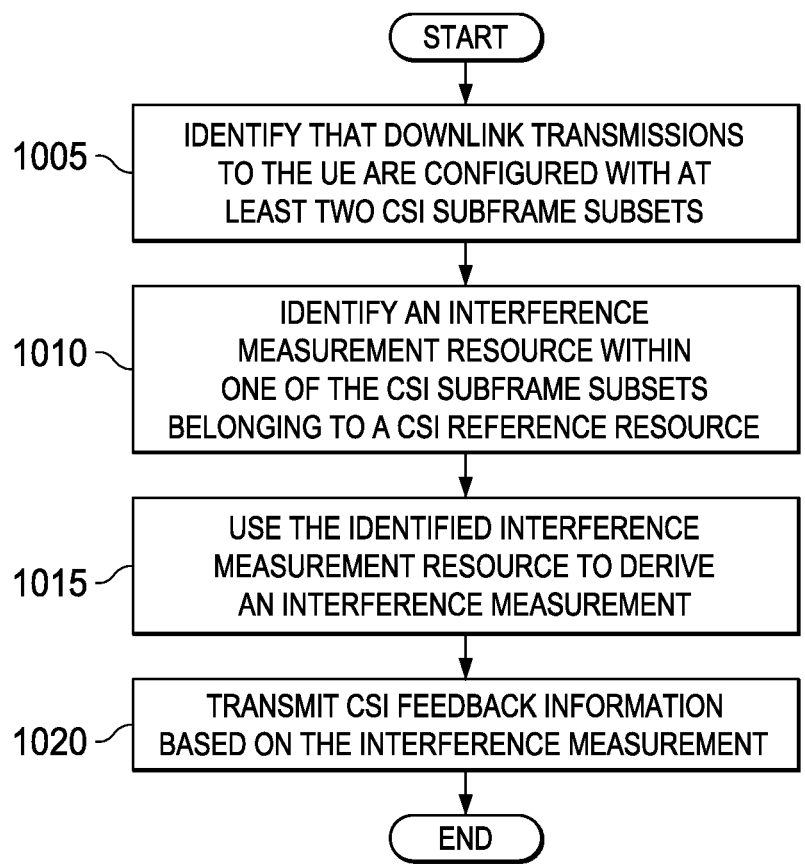
FIG. 10 illustrates a process for CSI feedback reporting by a UE in a coordinated multipoint communication system in accordance with various embodiments of the present disclosure.

FIG. 10 illustrates a process for CSI feedback reporting by a UE in a coordinated multipoint communication system in accordance with various embodiments of the present disclosure. For example, the process depicted in FIG. 10 may be performed by the transmitter 405 and/or receiver 410 in FIG. 4. The process may also be implemented by the UE 505 in FIG. 5.

The process begins with the UE identifying that downlink transmissions to the UE are configured with at least two CSI subframe subsets (step 1005). For example, in step 1005, the network may use eICIC or configure transmission mode 10. The UE then identifies an interference measurement resource within one of the CSI subframe subsets belonging to a CSI reference resource (step 1010). For example, in step 1010, the CSI reference resource is a resource corresponding to feedback of the UE.

The UE then uses the identified interference measurement resource to derive an interference measurement (step 1015). For example, in step 1015, the UE performs the interference measurement using the IM resource on the corresponding subframe subset as configured for that CSI request. The UE then transmits CSI feedback information based on the interference measurement (step 1020), with the process terminating thereafter. For example, in step 1020, the UE may transmit the CSI feedback information in a UCI transmission to a base station. The CSI feedback information may include one or more CQI values that are computed using the derived interference measurement. The CSI feedback by the UE corresponds to a CSI process (or TP) that is associated with the CSI-RS resource and an interference measurement resource. The CSI process may be configured for the UE via higher layer signaling.

Although FIG. 10 illustrates an example of a process for CSI feedback reporting by a UE in a coordinated multipoint communication system, various changes may be made to FIG. 10. For example, while shown as a series of steps, various steps in each figure could overlap, occur in parallel, occur in a different order, or occur multiple times.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for channel state information (CSI) feedback reporting by a user equipment (UE) in a coordinated multipoint communication system, the method comprising:
    receiving, from a base station, CSI configuration information configuring a CSI process, the CSI configuration information defined based on an interference measurement (IM) resource index and a CSI reference signal (CSI-RS) resource index;
    measuring a channel using a CSI-RS resource and an interference using an IM resource, the CSI-RS resource being indicated by the CSI-RS resource index and the IM resource being indicated by the IM resource index; and
    transmitting CSI feedback information based on the measured channel and interference,
    wherein the CSI-RS resource is associated with a non-zero power CSI-RS and the IM resource is associated with a zero power CSI-RS,
    wherein the IM resource indicated by the IM resource index belongs to one of two CSI subframe subsets in case that downlink transmissions to the UE are configured with the two CSI subframe subsets,
    wherein the IM resource index indicates the zero power CSI-RS,
    wherein the zero power CSI-RS is associated with one CSI-RS resource configuration among 16 CSI-RS resource configurations, and
    wherein the 16 CSI-RS resource configurations are used for zero-power CSI-RS based on a 4Tx CSI-RS pattern.

2. The method of claim 1, wherein the CSI configuration information further includes a reference transmitted power Pc value for the CSI process and CSI-RS power related information for the CSI process.

3. The method of claim 1, wherein the CSI feedback information further includes a channel quality indicator (CQI) value.

4. The method of claim 1, wherein the CSI configuration information is received via higher layer signaling.

5. The method of claim 1, wherein the UE is configured to report feedback for independent periodic physical uplink control channel (PUCCH) reporting for multiple CSI configurations and wherein periodic feedback mode parameters for two or more CSI configurations are set up independently.

6. A method for receiving channel state information (CSI) feedback reporting at base station in a coordinated multipoint communication system, the method comprising:
transmitting, to a user equipment (UE), CSI configuration information configuring a CSI process, the CSI configuration information defined based on an interference measurement (IM) resource index and a CSI reference signal (CSI-RS) resource index; and
receiving CSI feedback information generated based on a channel and an interference,
wherein the channel is measured using a CSI-RS resource indicated by the CSI-RS resource index,
wherein the interference is measured using an IM resource indicated by the IM resource index, wherein the IM resource indicated by the IM resource index belongs to one of two CSI subframe subsets in case that downlink transmissions for the UE are configured with the two CSI subframe subsets,
wherein the CSI-RS resource is associated with a non-zero power CSI-RS and the IM resource is associated with a zero power CSI-RS,
wherein the IM resource index indicates the zero power CSI-RS,
wherein the zero power CSI-RS is associated with one CSI-RS resource configuration among 16 CSI-RS resource configurations, and
wherein the 16 CSI-RS resource configurations are used for zero-power CSI-RS based on a 4Tx CSI-RS pattern.

7. The method of claim 6, wherein the CSI configuration information further includes a reference transmitted power Pc value for the CSI process and CSI-RS power related information for the CSI process.

8. The method of claim 6, wherein the CSI feedback information includes a channel quality indicator (CQI) value.

9. The method of claim 6, wherein the CSI configuration information is received via higher layer signaling.

10. An apparatus in a user equipment (UE) capable of channel state information (CSI) feedback reporting in a coordinated multipoint communication system, the apparatus comprising:
a controller configured to:
receive, from a base station, CSI configuration information configuring a CSI process, the CSI configuration information defined based on an interference measurement (IM) resource index and a CSI reference signal (CSI-RS) resource index,
measure a channel using a CSI-RS resource and an interference using an IM resource, the CSI-RS resource being indicated by the CSI-RS resource index and the IM resource being indicated by the IM resource index, and
transmit CSI feedback information based on the measured channel and interference,
wherein the CSI-RS resource is associated with a non-zero power CSI-RS and the IM resource is associated with a zero power CSI-RS,
wherein the IM resource indicated by the IM resource index belongs to one of two CSI subframe subsets in case that downlink transmissions to the UE are configured with the two CSI subframe subsets,
wherein the IM resource index indicates the zero power CSI-RS,
wherein the zero power CSI-RS is associated with one CSI-RS resource configuration among 16 CSI-RS resource configurations, and
wherein the 16 CSI-RS resource configurations are used for zero-power CSI-RS based on a 4Tx CSI-RS pattern.

11. The apparatus of claim 10, wherein the CSI configuration information further includes a reference transmitted power Pc value for the CSI process and CSI-RS power related information for the CSI process.

12. The apparatus of claim 10, wherein the CSI feedback information further includes a channel quality indicator (CQI) value.

13. The apparatus of claim 10, wherein the CSI configuration information is received via higher layer signaling.

14. The apparatus of claim 10, wherein the UE is configured to report feedback for independent periodic physical uplink control channel (PUCCH) reporting for multiple CSI configurations and wherein periodic feedback mode parameters for two or more CSI configurations are set up independently.

15. An apparatus for receiving channel state information (CSI) feedback reporting at base station in a coordinated multipoint communication system, the apparatus comprising:
a controller configured to
transmit, from the base station, CSI configuration information configuring a CSI process, the CSI configuration information defined based on an interference measurement (IM) resource index and a CSI reference signal (CSI-RS) resource index; and
receive CSI feedback information based on a channel and an interference,
wherein the channel is measured using a CSI-RS resource indicated by the CSI-RS resource index,
wherein the interference is measured using an IM resource indicated by the IM resource index, wherein the IM resource indicated by the IM resource index belongs to one of two CSI subframe subsets in case that downlink transmissions for a user equipment (UE) are configured with the two CSI subframe subsets,
wherein the CSI-RS resource is associated with a non-zero power CSI-RS and the IM resource is associated with a zero power CSI-RS,
wherein the IM resource index indicates the zero power CSI-RS,
wherein the zero power CSI-RS is associated with one CSI-RS resource configuration among 16 CSI-RS resource configurations, and
wherein the 16 CSI-RS resource configurations are used for zero-power CSI-RS based on a 4Tx CSI-RS pattern.

16. The apparatus of claim 15, the CSI configuration information further includes a reference transmitted power Pc value for the CSI process and CSI-RS power related information for the CSI process.

17. The apparatus of claim 15, wherein the CSI feedback information includes a channel quality indicator (CQI) value.

18. The apparatus of claim 15, wherein the CSI configuration information is received via higher layer signaling.

19. The method of claim 1, wherein the IM resource is identified by selecting one CSI subframe subset that is linked to periodic CSI reporting from among the two CSI subframe subsets.

* * * * *